H. GINDELE.
METHOD OF PREPARING PHOTOGRAPHIC FILM CARTRIDGES.
APPLICATION FILED FEB. 24, 1916.

1,251,766.

Patented Jan. 1, 1918.
2 SHEETS—SHEET 1.

H. GINDELE.
METHOD OF PREPARING PHOTOGRAPHIC FILM CARTRIDGES.
APPLICATION FILED FEB. 24, 1916.

1,251,766.

Patented Jan. 1, 1918.
2 SHEETS—SHEET 2.

Witness
J. W. Michael
H. G. Pierson

Inventor
Harrison Gindele
By Edson Bros
Attorneys

UNITED STATES PATENT OFFICE.

HARRISON GINDELE, OF CINCINNATI, OHIO.

METHOD OF PREPARING PHOTOGRAPHIC-FILM CARTRIDGES.

1,251,766. Specification of Letters Patent. Patented Jan. 1, 1918.

Original application filed September 14, 1915, Serial No. 50,536. Divided and this application filed February 24, 1916. Serial No. 80,232.

*To all whom it may concern:*

Be it known that I, HARRISON GINDELE, a citizen of the United States, residing at Cincinnati, in the county of Hamilton and State of Ohio, have invented certain new and useful Improvements in Methods of Preparing Photographic-Film Cartridges; and I do hereby declare the following to be a full, clear, and exact description of the invention, such as will enable others skilled in the art to which it appertains to make and use the same.

It has been found difficult to remove an exposed section from a strip of sensitized photographic film capable of receiving a plurality of exposures without injury to the remainder of the strip.

In some types of photographic cameras a series of exposures are successively made on a strip of sensitized film. It is not infrequent that after one or more exposures are made, a considerable interval intervenes before the remainder of the strip is exposed to photographic subjects. It is sometimes desirable to develop a particular exposed section of the film before an opportunity arises to expose the remainder of the film in the regular way. If a part of the film is cut from the strip, the remainder of the strip should be secured to the usual backing strip, otherwise, the film strip will not feed properly in the camera, nor can it be properly developed by the machine method. In view of the character of the surface of some films now upon the market, it is a difficult matter to apply an adhesive strip to secure the film to its backing strip without loss of the exposed surface, and it is not desirable to apply mechanical fastening means, such as clips, to perform this function, owing to the space which such devices would occupy within the camera.

This invention discloses subject matter divided from my application Serial No. 50,586, which was filed on September 14, 1915. The invention relates to a method of preparing films for use within the camera and thereafter treating predetermined exposed sections of the sensitized film having exposed and unexposed portions, and permitting the unexposed portions of the film to be replaced in operative position in the camera to receive future exposure. The method includes the employment of a film having a slit formed therein through which a portion of an adhesive winged strip may be inserted to have its gummed surface contact with the sensitized surface of the film. These perforated and gummed strips are provided for each exposure section of the film, and the gummed section may be secured to the film at the factory. Other portions, such as the wings of the adhesive strip are designed to be secured to the film protecting strip, or the autographic strip, whereby a strip of sensitized film may be secured to a backing or protecting strip after a section of the film has been removed intermediate the ends of the strip.

The film strip is preferably scored or cut to permit of the ready detachment of the exposure sections from the body of the film strip, and the adhesive strips are also preferably perforated or scored to correspond to the cut-out or scored portions of the film sections to facilitate the detachment of the film sections from their backing strips for developing purposes, or for machine or tank development.

To enable others to understand the invention, reference is made to the accompanying drawings, wherein:

Figure 1 is a plan view showing a portion of a film perforated.

Fig. 2 discloses the film provided with the adhesive strips.

Fig. 3 discloses the rear of the film with the adhesive strips secured to the backing.

Figure 2:
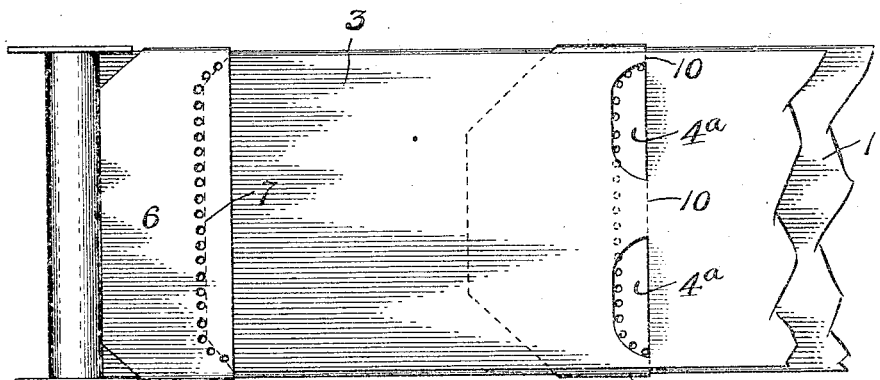
Figure 1:
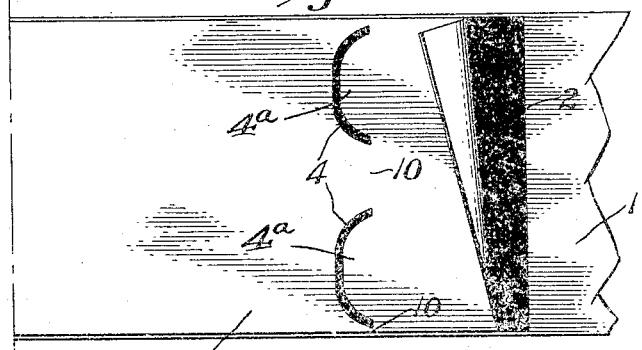
Figure 3:
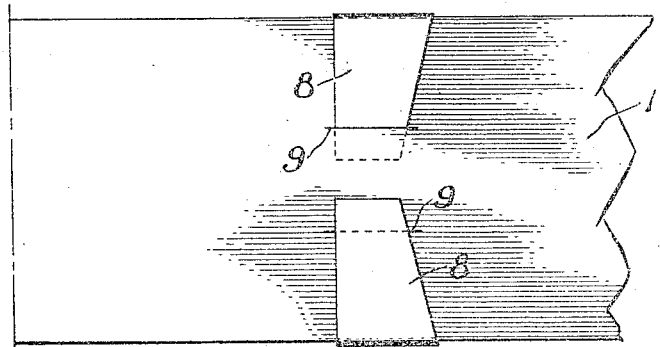
Figure 5:
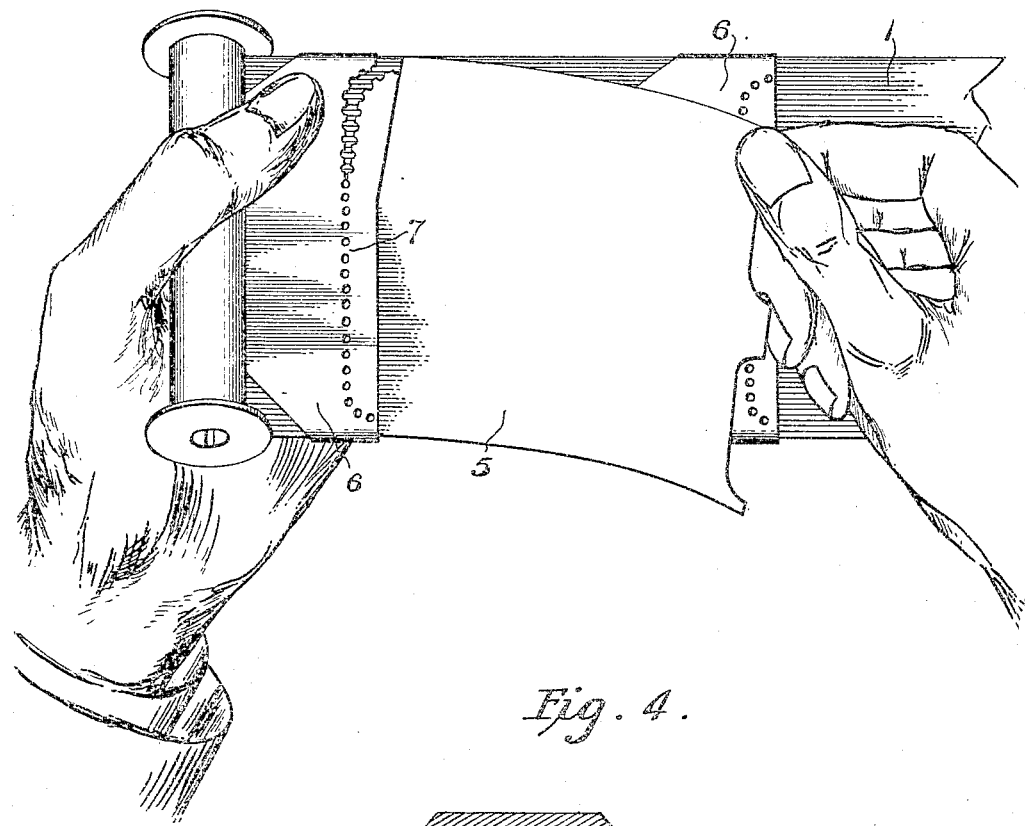
Fig. 5 is a detail view showing the removal of one of the sections.

The method may be employed in any type of roll film, and the film is usually provided with a backing strip which is indicated in the drawings at 1. Some types of films are provided with an autographic strip which is indicated at 2. The strip of sensitized film is illustrated at 3, and is preferably cut with arcuate slots 4 at the end of each of the exposure sections, so that an exposure section 5 may be easily and quickly separated from the film strip. It is obvious that other forms or perforations than those disclosed at 4 may be employed.

Figure 4:
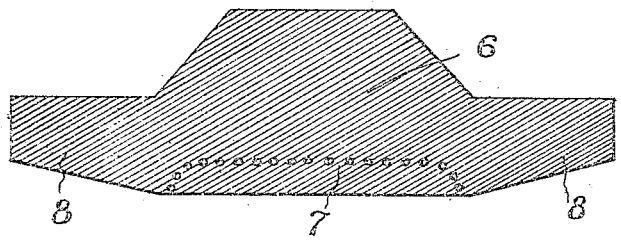
Fig. 4 is a detail view of one of the gummed tabs or strips.

Associated with the film strip is an adhesive strip or tab, shown in Fig. 4 as provided with a body 6 having a perforated section 7 and wings 8, one surface of this strip being provided with an adhesive substance. The perforated section 7 of the tab is positioned between the film strip 3 and a backing strip 1 or 2, so that the section 7 may be passed through the arcuate slots 4 and may then be moistened and secured to the portion 4ª of the film strip.

The backing strip 1 may be provided with slits 9 through which the ends of the wings 8 may be inserted, leaving the adhesive tab 6 merely secured to the sensitized film when it leaves the factory. This may be found desirable, as a limited amount of play is usually found necessary between the film and its backer when feeding the film through the camera to make the exposures. If desired, however, the wings 8 may be secured directly to the back of the backing strip 1 at the factory, and they are designed to be positioned over the slits 9 to exclude lights from passing therethrough.

Assuming that an exposure has been made on the film section 5, the operator may take the camera into a place where light is subdued, for example, a dark room, and open the camera to expose the back of the film. The winged sections 8 may then be withdrawn from the slits 9, the adhesive side thereof moistened and the wings 8 securely fastened to the back of the backing strip 1 or the protective strip 2 as may be desired. The section 5 to be removed from the film strip may be separated from the strip at its retaining portions 10, either by tearing it from the strip or using a knife or other instrument. The adhesive tab 6 is torn from the backing strip along the lines of its perforation 7, and the section which is secured to the film section 5 remains on the film to be detached by the solutions during development. The camera may now be closed, and the remainder of the film exposed to photographic subjects in the usual manner, after which the film may be placed in a machine for development, or in a tank, for developing the entire remaining strip, or sections of the strip secured to the backer, as the case may be. After the remaining portions of the film shall have been developed, the remaining film sections may be removed from the backing strip 1 by separating it on the scored lines 4 and 10 of the film and 7 of the adhesive strip.

By this method, the films may be removed as exposed without affecting the unexposed portions of the film or affecting the machine development of the film.

Having thus described my invention, what I claim as new and desire to secure by Letters Patent, is:—

1. The method of preparing a sensitized photographic film so that an exposed section may be removed from a film strip adapted to receive a plurality of exposures, which consists in perforating the film strip intermediate its ends, and sealing the film strip to the protecting backing strip at a plurality of points throughout the length of the film by an adhesive strip to facilitate the detachment of the exposed section from the backing strip and from the film strip on the lines of perforations.

2. The method of preparing photographic films having a backing strip which comprises a perforating sensitized film at the division lines of the exposure sections thereof, passing a portion of a winged adhesive strip through the perforations of the film and sealing a portion of said strip to the film, and folding the wings of the adhesive strip into contact with its backing strip.

3. The method of preparing photographic films having a slitted backing strip which comprises cutting out the sensitized film at substantially the division lines of the exposed sections thereof, passing a portion of a winged adhesive strip through the cut-out portions of the film and sealing said strip to the film at the cut-out portions thereof, sealing the backing strip at predetermined points to correspond with an end of an exposure section of the film, and passing the free ends of the wings of the adhesive strip through the slits of the backing strip.

4. The method of preparing photographic films having a backing strip comprising cutting out a portion of the film to receive a part of the body of an adhesive winged strip and to leave a portion of the film to contact with said strip, sealing the protruding part of the adhesive strip to the section of the film contacting therewith, placing the wings of the adhesive strip into contact with a surface of the backing strip, and sealing the wings to the backing strip.

5. The method of preparing photographic films having a backing strip comprising cutting out a portion of the film to leave film tab sections, and to receive a part of the body of an adhesive winged strip through said cut-out portions, providing the adhesive strip with a row of perforations in alinement with the cut-out portions of the film, sealing the part of the adhesive strip which is extended through the cut-out portion of the film to the surface of the film at the tabs thereof, folding the wings of the adhesive strip over the exterior of a film backing strip and sealing the wings thereto, and removing the film exposure section from the film strip by severing the film sections on the line of their cut-out portions and severing the adhesive strip from the backing strip on its perforated portion.

In testimony whereof, I affix my signature, in presence of two witnesses.

HARRISON GINDELE.

Witnesses:
 LEONORE GINDELE,
 REUBEN GINDELE.